United States Patent
Okada

(10) Patent No.: US 9,076,100 B2
(45) Date of Patent: Jul. 7, 2015

(54) IMAGE FORMING APPARATUS, PRINT SYSTEM, AND RECORDING MEDIUM CONFIGURED TO ANALYZE JOB DATA OF A JOB AND OBTAINING LIST DISPLAY INFORMATION

(71) Applicant: KONICA MINOLTA, INC., Chiyoda-ku (JP)

(72) Inventor: Tatsunori Okada, Nagaokakyo (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/338,835

(22) Filed: Jul. 23, 2014

(65) Prior Publication Data
US 2015/0029551 A1    Jan. 29, 2015

(30) Foreign Application Priority Data
Jul. 24, 2013   (JP) .................................. 2013-153682

(51) Int. Cl.
  *G06F 3/12*    (2006.01)
  *G06K 15/02*   (2006.01)

(52) U.S. Cl.
CPC .......... *G06K 15/1894* (2013.01); *G06F 3/1285* (2013.01); *G06F 3/1268* (2013.01); *G06F 3/1211* (2013.01); *G06K 2215/0002* (2013.01)

(58) Field of Classification Search
CPC ... G06F 3/1265; G06F 3/1267; G06F 3/1268; H04L 67/06; H04L 67/02; H04L 67/42
USPC ................... 358/1.1–3.29, 1.11–1.18
See application file for complete search history.

(56) References Cited

U.S. PATENT DOCUMENTS

| | | | |
|---|---|---|---|
| 2009/0316189 A1 | 12/2009 | Yamauchi et al. | |
| 2010/0079781 A1* | 4/2010 | Yamamoto | 358/1.13 |
| 2011/0317214 A1* | 12/2011 | Hamada et al. | 358/1.15 |

FOREIGN PATENT DOCUMENTS

| | | |
|---|---|---|
| JP | 2010-003006 A | 1/2010 |
| JP | 2012-198826 A | 10/2012 |

* cited by examiner

*Primary Examiner* — Marcellus Augustin
(74) *Attorney, Agent, or Firm* — Buchanan Ingersoll & Rooney PC

(57) ABSTRACT

An image forming apparatus constituting a print system includes a reception unit configured to receive a job, a determination unit configured to analyze job data of the job, and determine whether or not the job involves a storage job for performing data storage processing to a non-volatile storage unit of the image forming apparatus, an analysis unit, and a communication unit. In a case where the job is determined to involve the storage job, the analysis unit performs simplified analysis processing for obtaining list display information for displaying storage target data stored by the storage job prior to the data storage processing. When the communication unit receives a display request for displaying a list of jobs including the storage job from a second image forming apparatus, the communication unit transmits, to the second image forming apparatus, list information including information about the storage target data.

15 Claims, 14 Drawing Sheets

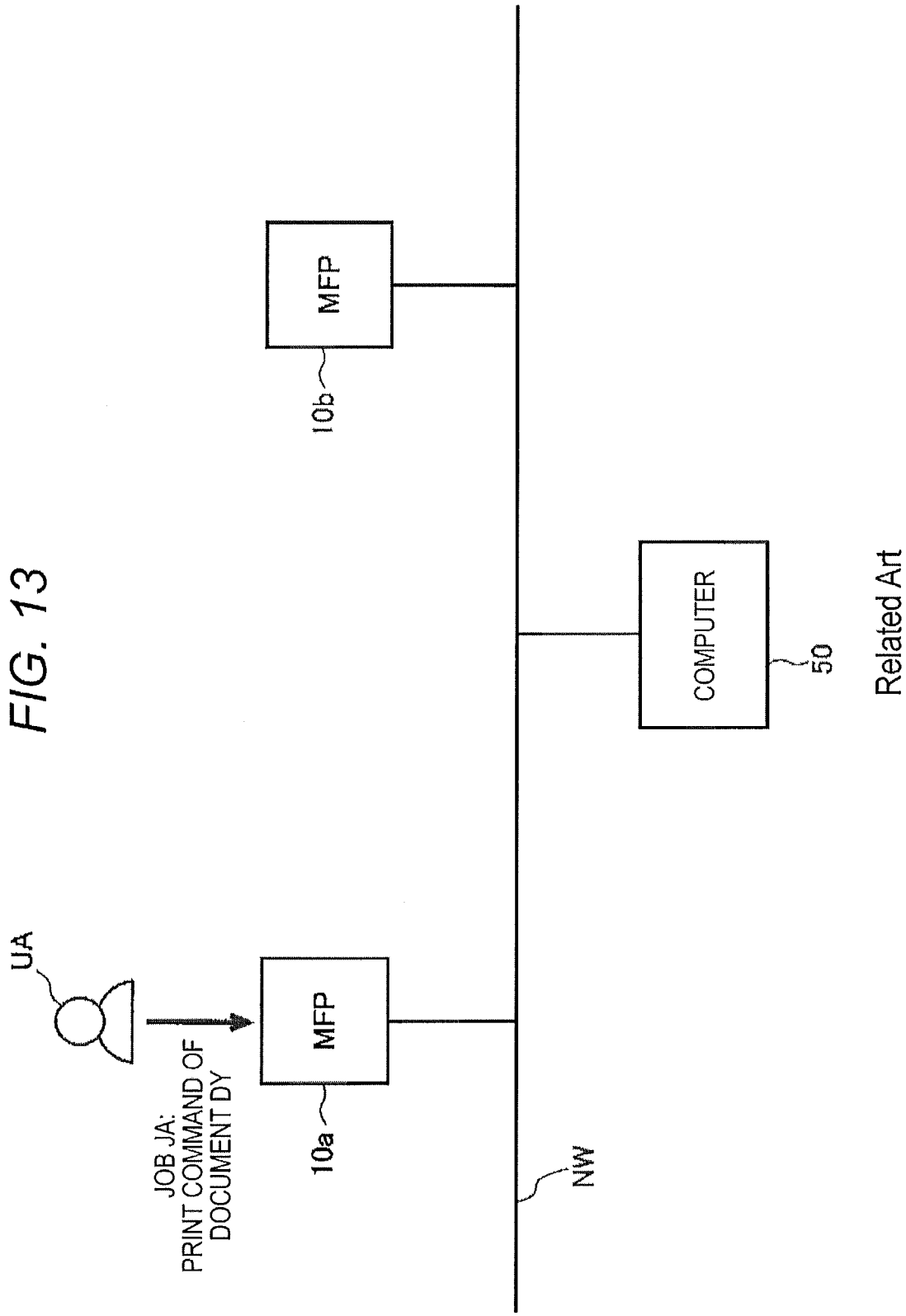

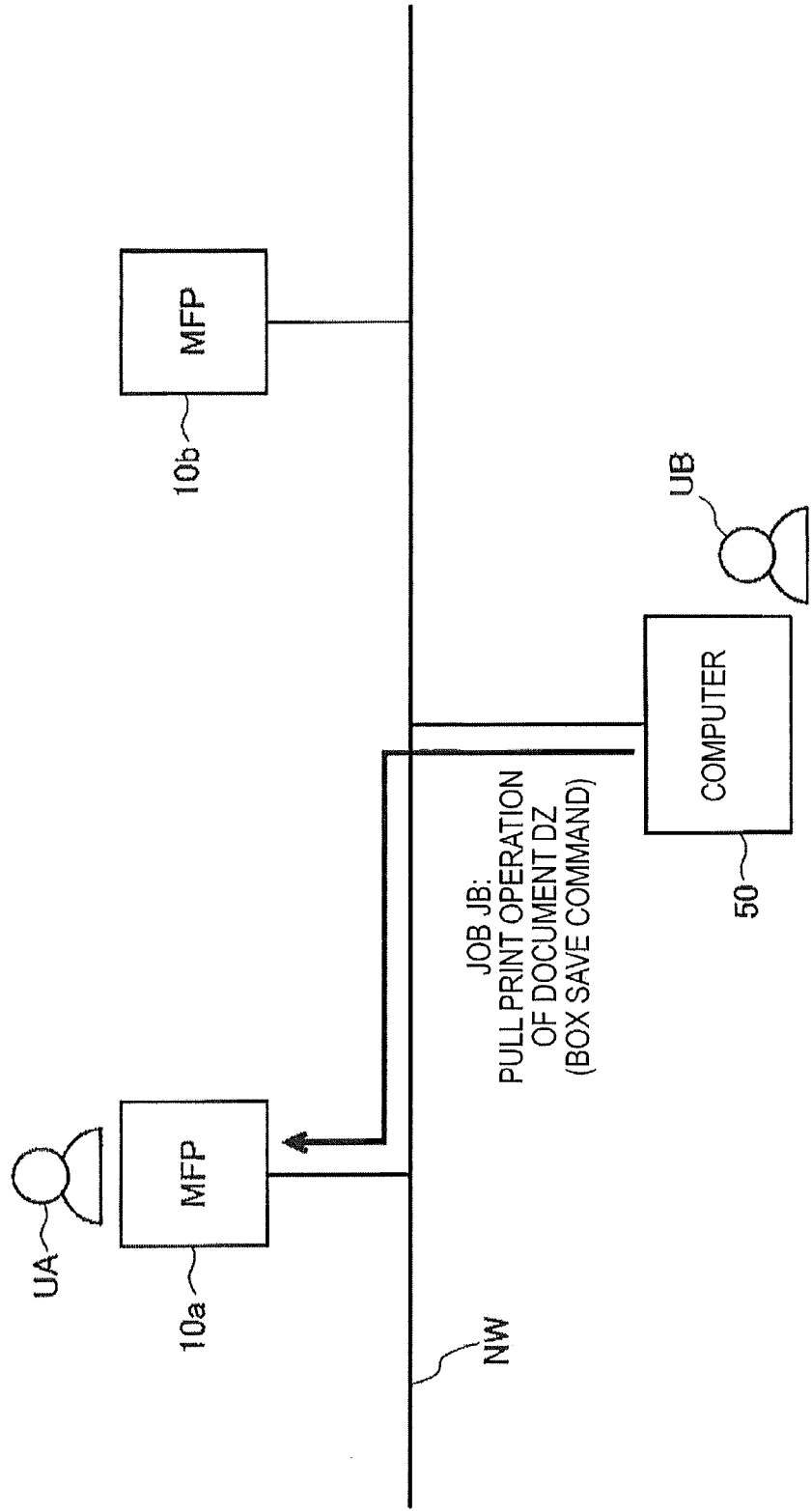

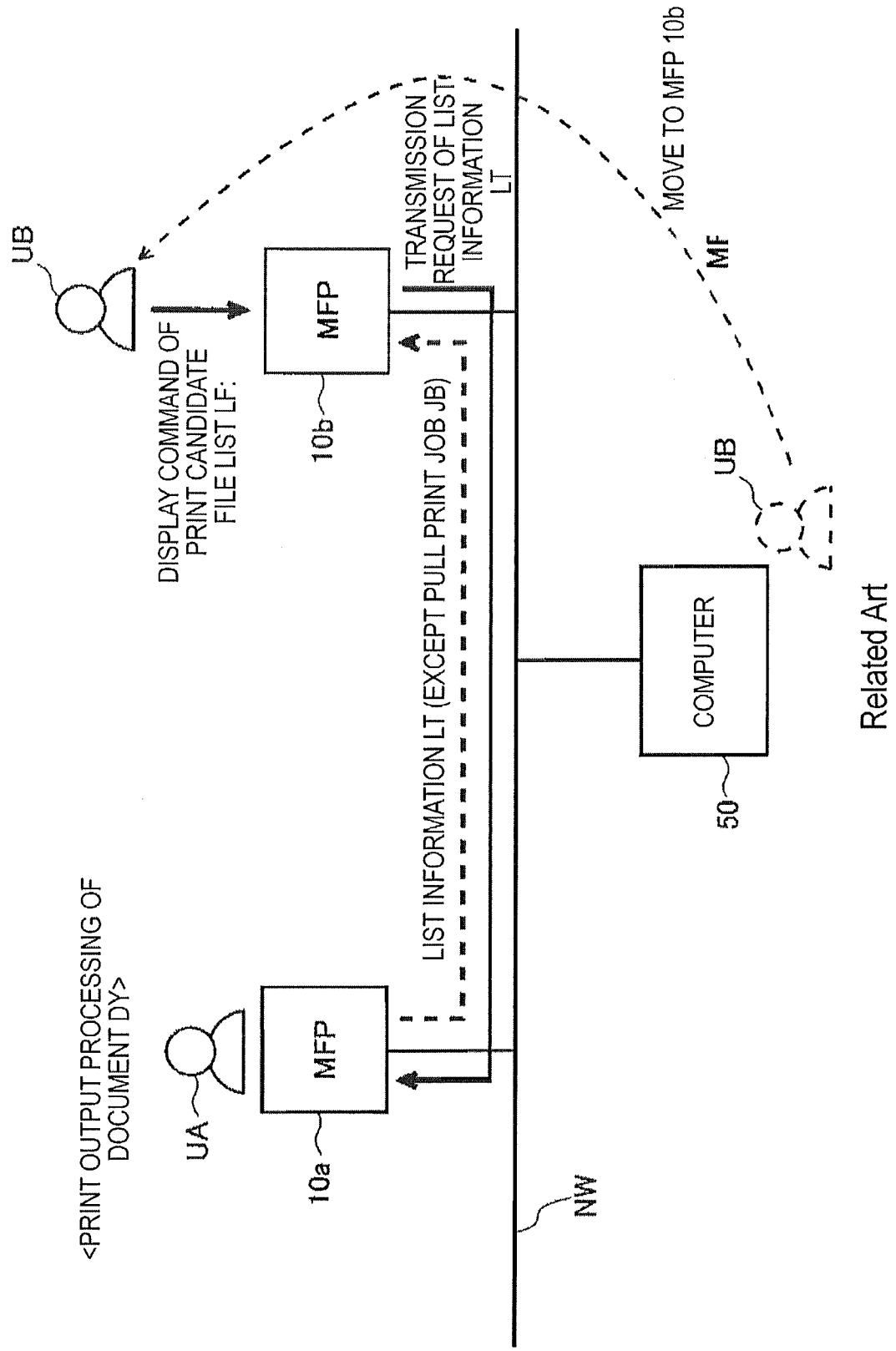

IMAGE FORMING APPARATUS, PRINT SYSTEM, AND RECORDING MEDIUM CONFIGURED TO ANALYZE JOB DATA OF A JOB AND OBTAINING LIST DISPLAY INFORMATION

This application is based on Japanese Patent Application No. 2013-153682 filed with the Japan Patent Office on Jul. 24, 2013, the entire content of which is hereby incorporated by reference.

BACKGROUND OF THE INVENTION

1. Field of the Invention

The present invention relates to an image forming apparatus such as an MFP (Multi-Functional Peripheral) and a technique related thereto.

2. Description of the Related Art

There is a technique for performing print output after a user logs in to an image forming apparatus, instead of immediately causing the image forming apparatus to execute print output, on the basis of print data which have been transmitted from a computer. Such technique will be referred to as a pull print technique (or authenticated print technique) (see Japanese Laid-Open Patent Publication No. 2010-3006 A). According to this technique, after a user moves from a location where the computer exists to a location where the image forming apparatus exists, the image forming apparatus performs print output, and therefore, a print output material which is output to a sheet discharge tray and the like of the image forming apparatus can be prevented from being seen by others.

Such techniques include a technique for using a server computer (which may also be simply referred to as a server). More specifically, first, a user UB operates a client computer to transmit data of a print target document (print data) to the server. In other words, the print data of a pull print job of the user UB of the client computer (which may also be simply referred to as an authenticated print job) are transmitted from the computer to the server, and the print data are temporarily stored in the server. At this occasion, print output processing based on the print data has not yet been performed. Thereafter, this time, user authentication operation is performed using an operation input unit and the like of the image forming apparatus, and then, the print data are retrieved (pulled) from the server, and the image forming apparatus performs print output (performs printing).

However, print systems include a system constituted by a plurality of MFPs without providing any server. Such system is also referred to as a server-less print system (or a server-less ubiquitous system) and the like.

Such server-less print system also performs pull print (see FIGS. 13 to 15). In the server-less print system, any given MFP 10a of multiple MFPs 10 (10a, 10b, ...) is configured to achieve the same function as the server.

The pull print performed by a certain user UB is done as follows, for example. First, as shown in FIG. 14, a pull print job (more specifically, box save command) of the user UB is transmitted from a computer 50 to the MFP 10a. Subsequently, as shown in FIG. 15, the user UB moves from the location where the computer 50 exists to the location where the MFP 10b exists, and the user UB operates the MFP 10b to try to cause the MFP 10b to print and output a document DZ of the pull print job. More specifically, the user UB logs in to the MFP 10b, and thereafter, the user UB tries to display a print candidate file list for the user UB.

In a normal state, the print candidate file list (list including storage target data (document DZ) that are stored by a storage job) is displayed, and the user UB selects the document file (document DZ) of the print target from among the print candidate file list, and gives a print output command. Then, in response to this print output command, a print output material based on the pull print job is printed and output by the MFP 10b.

However, depending on the operation state of the MFP 10a which is the storage destination of the data of the pull print job, there would be a delay in displaying of the print candidate file list on the MFP 10b, and there may be a delay in the time point of finish of the data storage processing (accumulation processing) of the pull print job given by the user UB.

For example, as shown in FIG. 14, such situation would occur if the MFP 10a has already received a print output job from another user UA and the MFP 10a is executing the print output job thereof (a print output operation of a document DY) when the pull print job given by the user UB is transmitted from the computer 50 to the MFP 10a. FIG. 13 shows a case where the print output job was given by the user UA prior to the pull print job operation of FIG. 14, and the print output of the document DY has been started.

In this case, because the processing performance and the like of the MFP 10a are limited, and because, e.g., the hard disk drive (HDD) is already used in the print output operation of the MFP 10a, the MFP 10a cannot immediately store the data of the pull print job given by the computer 50 into the hard disk drive.

Therefore, as shown in FIG. 15, even if the MFP 10a receives a display request from the MFP 10b concerning the print candidate file list of the pull print jobs, the MFP 10a has not yet finished the data storage processing of the job data, and has not yet obtained the data for displaying the job list. Even if list information LT is replied from the MFP 10a to the MFP 10b at this occasion, the list information LT does not include information about the pull print job JB (e.g., information about the document file of the storage target in the storage job).

Therefore, the user UB cannot find the desired print target file (storage target document file) in the print candidate file list displayed by the MFP 10b, and the user UB is confused by being unable to find, in the list, the desired file of the pull print job JB, which the user UB believes to have transmitted to the computer 50. In particular, in many cases, the user UB cannot find that there is a delay due to a job of another user UA, and in many cases, the user UB cannot understand the situation. Then, after about a predetermined period of waiting time passes, the user UB is required to perform operation all over again from the login operation to the MFP 10b, and do display operation again to display the print candidate file list of the pull print jobs for the user UB. Therefore, sometimes, the user UB has no choice but to wait for a relatively long period of time.

As described above, because information for displaying the list cannot be obtained until the MFP 10a finishes the data storage processing of the job data, there is a problem in that it takes a pretty long time for the storage target data (document DZ) stored by the storage job of the pull print job JB to be displayed in the print candidate file list of another MFP 10b.

SUMMARY OF THE INVENTION

Therefore, it is an object of this invention to provide an image forming apparatus capable of displaying storage target data of a storage job in a list relatively in a short time, and to provide a technique related thereto.

To achieve the abovementioned object, according to one aspect, there is provided an image forming apparatus constituting a print system, the image forming apparatus including: a reception unit configured to receive a job; a determination unit configured to analyze job data of the job, and determine whether or not the job involves a storage job for performing data storage processing to a non-volatile storage unit of the image forming apparatus; an analysis unit configured to, in a case where the job is determined to involve the storage job, perform simplified analysis processing for obtaining, on the basis of the job data, list display information for displaying, as a list, storage target data stored by the storage job, prior to the data storage processing; and a communication unit configured to transmit, to a second image forming apparatus, list information including information about the storage target data which is list information based on the list display information, when the communication unit receives a display request for displaying a list of a job or two or more jobs including the storage job from the second image forming apparatus which is an image forming apparatus different from a first image forming apparatus which is the image forming apparatus.

According to another aspect, there is provided a print system including a plurality of image forming apparatuses, the print system including: a first image forming apparatus configured to receive various kinds of job; a storage job request apparatus configured to receive a request of a storage job in accordance with operation of an operator, and transmit data of the storage job to the first image forming apparatus; and a second image forming apparatus configured to display a list of a job or two or more jobs including the storage job, and designate print target data on the basis of the list, wherein the first image forming apparatus includes: a reception unit configured to receive a job; a determination unit configured to analyze job data of the job, and determine whether or not the job involves a storage job for performing data storage processing to a non-volatile storage unit of the first image forming apparatus; an analysis unit configured to, in a case where the job is determined to involve the storage job, perform simplified analysis processing for obtaining, on the basis of the job data, list display information for displaying, as a list, storage target data stored by the storage job, prior to the data storage processing; and a communication unit configured to transmit, to the second image forming apparatus, list information including information about the storage target data which is list information based on the list display information, when the communication unit receives a display request for displaying a list of a job or two or more jobs including the storage job from the second image forming apparatus.

According to the other aspect, there is provided a non-transitory recording medium storing a computer readable program, the program causing a computer served as an image forming apparatus to execute the processing including the steps of: a) receiving a job; b) analyzing job data of the job, and determining whether or not the job involves a storage job for performing data storage processing to a non-volatile storage unit of the image forming apparatus; c) in a case where the job is determined to involve the storage job, performing simplified analysis processing for obtaining, on the basis of the job data, list display information for displaying, as a list, storage target data stored by the storage job, prior to the data storage processing; d) when receiving a display request for displaying a list of a job or two or more jobs including the storage job from a second image forming apparatus which is an image forming apparatus different from a first image forming apparatus which is the image forming apparatus, transmitting list information, which indicates information about the storage target data which is list information based on the list display information, to the second image forming apparatus.

The foregoing and other object, features, aspects and advantages of the present invention will become more apparent from the following detailed description of the present invention when taken in conjunction with accompanying drawings.

BRIEF DESCRIPTION OF THE DRAWINGS

FIG. 13 is a schematic diagram illustrating operation according to the comparative example;

FIG. 14 is a schematic diagram illustrating operation according to the comparative example; and FIG. 15 is a schematic diagram illustrating operation according to the comparative example.

DESCRIPTION OF THE PREFERRED EMBODIMENTS

Hereinafter, an embodiment of the present invention will be hereinafter described with reference to drawings.

1. Overview of System

Figure 1:
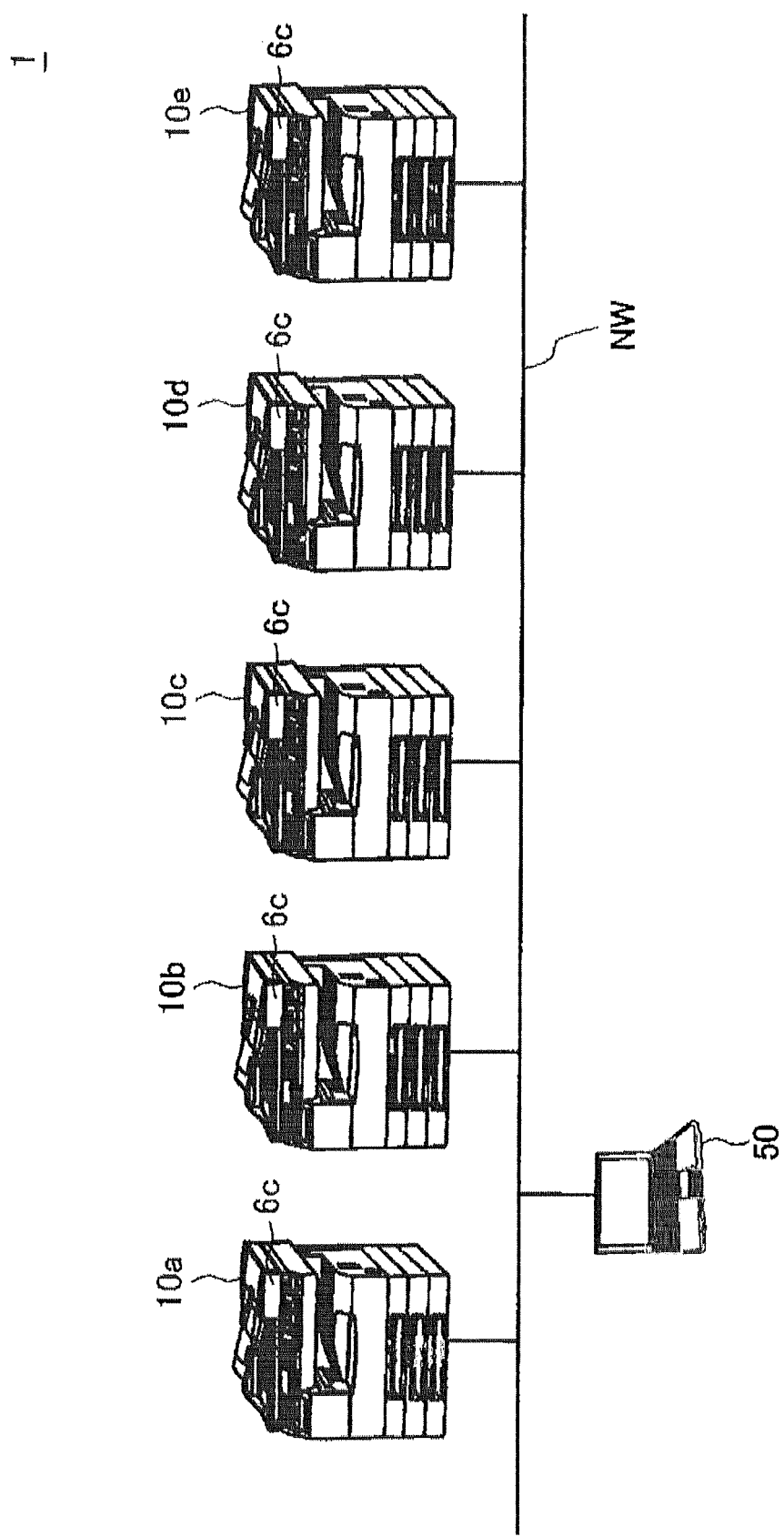
FIG. 1 is a schematic diagram illustrating a configuration of a print system.

FIG. 1 is a schematic diagram illustrating a configuration of a print system 1.

As shown in FIG. 1, the print system 1 is formed by including multiple image forming apparatuses (which may also referred to as print output apparatuses) 10 (more specifically, 10a, 10b, 10c, . . . ) and a computer 50. In this case, an MFP (Multi-Functional Peripheral) is shown as an example of the image forming apparatus 10.

Each MFP 10 and each computer 50 are connected via a network NW, and a network communication can be executed. It should be noted that the network NW is constituted by a LAN, a WAN, the Internet, and the like. The mode of connection to the network NW may be a wired connection or a wireless connection.

This print system 1 is a system constituted by multiple MFPs 10 without providing any server, and the print system 1 may also be referred to as a server-less print system. Since each of the multiple MFPs can access a document file stored in the print system 1 (including print output and the like), the print system 1 may also be referred to as a server-less ubiquitous system and the like. In the print system 1, the same function as the server (for example, data storage function) is achieved by an MFP 10 or two or more MFPs 10 of the multiple MFPs 10.

In this print system 1, a pull print operation (authenticated print operation) is performed. More specifically, the print system 1 is a system in which an image forming apparatus selected by a user (for example, MFP 10b) performs print output by retrieving (pulling) print data stored in a pull print storage region (for example, a storage region in an HDD 5b of the MFP 10a) in response to print operation of the computer 50 (which may also be referred to as a print request source apparatus or a storage job request source apparatus). This print system 1 is also referred to as a pull print system or an authenticated print system.

The print system 1 executes not only the above pull print operation but also ordinary box print output operation and the like. The ordinary box print output operation is operation for performing print output a document stored in advance in a box in the HDD 5b of the MFP 10 (a document stored by storage operation other than the pull print operation) when a user uses an operation unit 6 (FIG. 2) of the MFP 10.

2. Configuration of MFP

Figure 2:
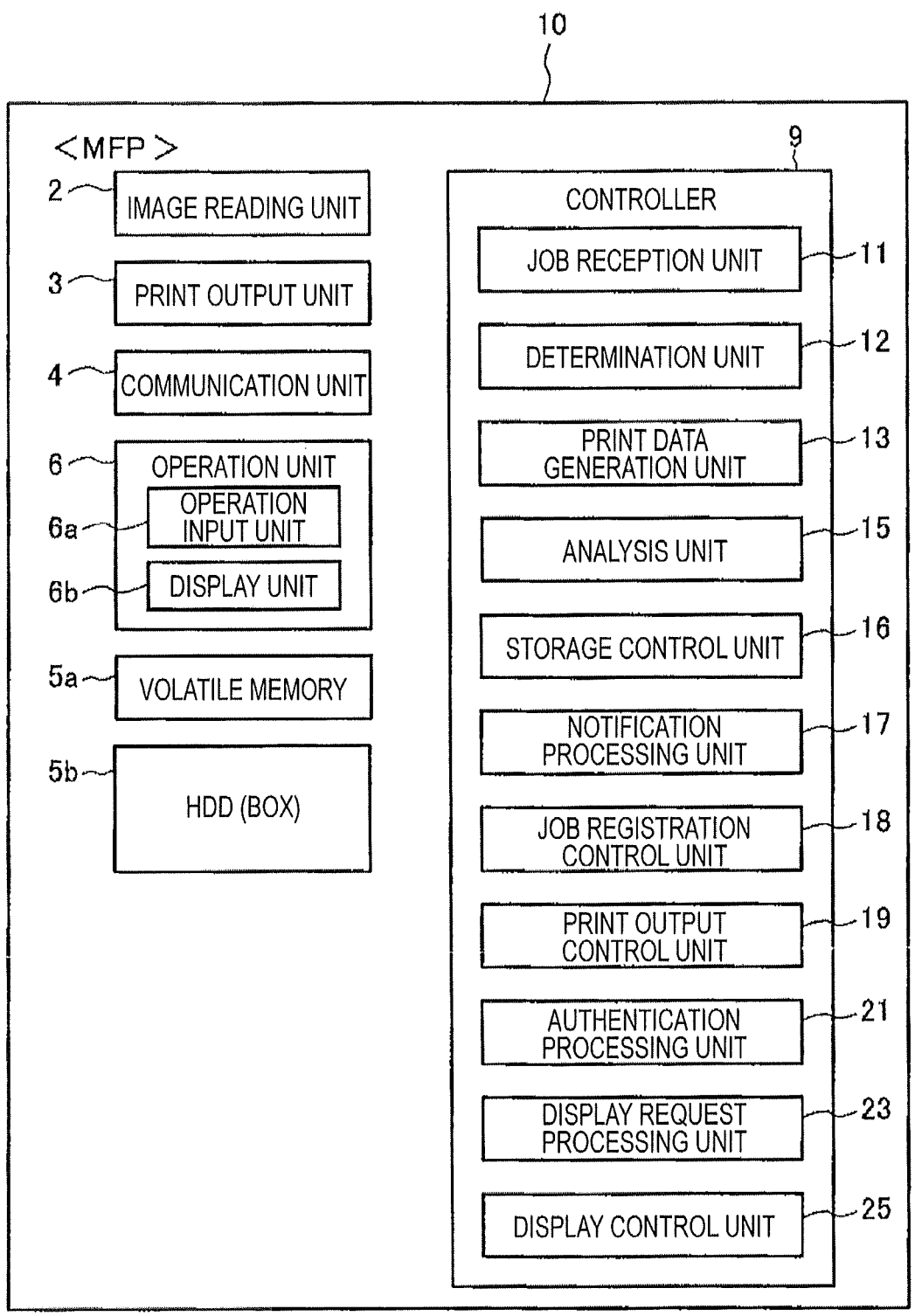
FIG. 2 is a functional block diagram illustrating a schematic configuration of an MFP.

FIG. 2 is a functional block diagram illustrating a schematic configuration of the MFP 10.

As shown in the functional block diagram of FIG. 2, the MFP 10 includes an image reading unit 2, a print output unit 3, a communication unit 4, a memory 5a, a hard disk drive (HDD) 5b, an operation unit 6, a controller 9, and the like. By causing these units to operate in a complex manner, various kinds of functions are achieved. It should be noted that the MFP 10 may also be expressed as an image forming apparatus, a print output apparatuses, or the like.

The image reading unit 2 is a processing unit for optically reading (i.e., scanning) an original document placed at a predetermined position of the MFP 10, and generating image data of the original document (which may also be referred to as an original document image or a scanned image). This image reading unit 2 is also referred to as a scan unit.

The print output unit 3 is an output unit for printing and outputting an image on various kinds of media such as paper on the basis of data of print target. The print output unit 3 may also be referred to as an image forming unit for forming an image on various kinds of media.

The communication unit 4 is a processing unit capable of performing facsimile communication via a public circuit and the like. Further, the communication unit 4 can perform network communication via the network NW. In this network communication, various kinds of protocols such as TCP/IP (Transmission Control Protocol/Internet Protocol) and FTP (File Transfer Protocol) are used. By using the network communication, the MFP 10 can exchange various kinds of data with a desired destination.

The memory 5a is a volatile storage unit (memory device). The memory 5a is used as a temporary memory and the like. The memory 5a temporarily stores job data and the like of a pull print job JB requested with the computer 50.

The hard disk drive (HDD) 5b is a non-volatile storage unit (memory device). The HDD 5b has one or more folders (which may also be referred to as boxes). Each box is a storage region (memory region) provided in the MFP 10. The box stores various kinds of data (for example, the storage data of the pull print job JB).

The operation unit 6 includes an operation input unit 6a for receiving input given to the MFP 10 and a display unit 6b for displaying and outputting various kinds of information. More specifically, the MFP 10 is provided with an operation panel 6c (see FIG. 1). This operation panel (touch screen) 6c is constituted by embedding a piezoelectric sensor and the like into a liquid crystal display panel. The operation panel (touch screen) 6c functions as a part of the display unit 6b, and also functions as a part of the operation input unit 6a.

The controller 9 is incorporated into the MFP 10, and is a control device for centrally controlling the MFP 10. The controller 9 is constituted as a computer system having a CPU, various kinds of semiconductor memories (a RAM and a ROM), and the like. The controller 9 achieves various kinds of processing units by causing the CPU to execute predetermined software programs (which may be also hereinafter simply referred to as programs) stored in a ROM (for example, EEPROM). It should be noted that the programs may be installed to the MFP 10 via a portable recording medium such as a USB memory or via a network and the like.

As shown in FIG. 2, the controller 9 achieves various kinds of processing units including a job reception unit 11, a determination unit 12, a print data generation unit 13, an analysis unit 15, a storage control unit 16, a notification processing unit 17, a job registration control unit 18, a print output control unit 19, an authentication processing unit 21, a display request processing unit 23, and a display control unit 25.

The job reception unit 11 is a processing unit for receiving various kinds of jobs such as a job given by operation input using the operation unit 6 of the MFP 10 and a job given by an external apparatus (the computer 50 and the like), and for receiving data of various kinds of jobs (job data).

The determination unit 12 analyzes a header portion HP of job data (FIG. 8) (described later), and determines whether, e.g., the received job is a pull print job (a job with a storage job for performing data storage processing to the HDD 5b in the MFP 10).

The print data generation unit 13 is a processing unit for generating print data of a print output job (more specifically, rasterization data and the like) when the job received by the job reception unit 11 is not the pull print job but is the print output job.

The analysis unit 15 is a processing unit for performing simplified analysis processing when the job is a pull print job (a job with a storage job). The simplified analysis processing is processing for obtaining list display information MD for displaying, as a list, storage target data stored by the pull print job (more specifically, a file name thereof and the like) on the basis of the job data (which may also be referred to as information obtaining processing). This simplified analysis processing is performed prior to the data storage processing performed by the storage control unit 16.

The storage control unit 16 is a processing unit for controlling, e.g., data storage processing of a storage job.

The job registration control unit 18 is a processing unit for registering each job to a job list (active job list) AL indicating a job executed by the MFP 10 (execution job). The job registration control unit 18 registers, e.g., a print output job JA given by the user UA and a pull print job JB given by the user UB to the job list AL. For example, the pull print job JB given by the user UB is registered to reflect the list display information MD obtained in the simplified analysis processing performed by the analysis unit 15.

The print output control unit 19 is a processing unit for controlling print output operation of the print output unit 3 on the basis of the print data generated by the print data generation unit 13 (more specifically, rasterization data and the like) and the like.

The notification processing unit 17 is a processing unit for notifying a user of occurrence of an error and the like. The notification processing unit 17 controls error notification processing (processing for displaying a message indicating occurrence of an error and the like) of the display unit 6b of the MFP 10 itself. The notification processing unit 17 also controls error notification processing (processing for notifying a message indicating occurrence of an error, the content of error, and the like) for another MFP 10 that cooperates with the MFP (10).

The authentication processing unit 21 is a processing unit for controlling login processing (authentication processing).

The display request processing unit 23 is a processing unit for performing processing of a display request of a print candidate file list LF (which may also be referred to as a list display request).

The display control unit 25 is a processing unit for controlling various kinds of display operations and the like of the display unit 6b.

In this embodiment, the multiple MFPs 10a to 10e have the same configuration. However, the MFP 10a of the multiple MFPs 10a to 10e is an apparatus carrying out the storage function for the system 1, and various kinds of data are particularly accumulated in the MFP 10a in a concentrated manner. The user may use any one of the multiple MFPs 10a to 10e to print and output storage target data stored in the MFP 10a by means of the data storage processing of the pull print job. More specifically, the print output processing of the pull print job (pull print processing) may be performed by any one of the multiple MFPs 10a to 10e.

3. Operation According to Comparative Example

Figure 12:
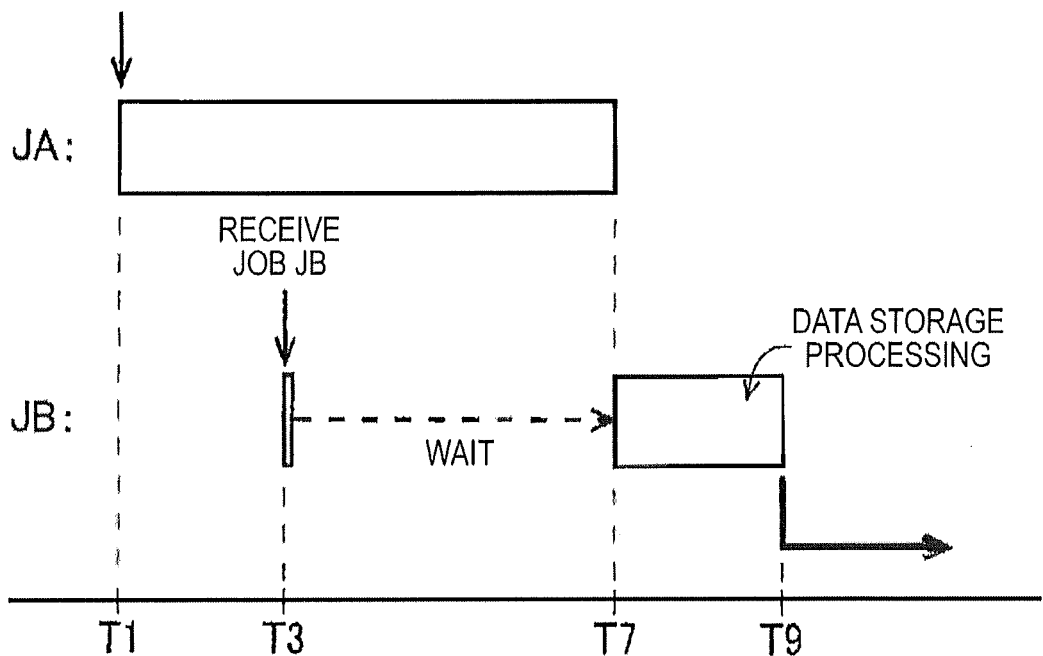
FIG. 12 is a figure illustrating execution timing and the like of each job according to a comparative example.

Prior to describing operation performed by the system 1 according to the present embodiment, operation according a comparative example will be described with reference to FIGS. 12 to 15. FIG. 12 is a figure illustrating execution timing and the like of each of jobs JA, JB according to the comparative example. FIGS. 13 to 15 are schematic diagrams illustrating operation according to the comparative example.

As shown in FIG. 13, first, a user UA operates an MFP 10a to give the print output job JA to the MFP 10a (time T1 of FIG. 12). The print output job JA is, for example, a job for printing and outputting a file (document DY) already stored in a box of an HDD 5b of the MFP 10a (box print job). In response to such processing for giving the print output job JA, the MFP 10a starts execution of the print output job JA.

Subsequently, as shown in FIG. 14, in response to operation performed by a user UB, the computer 50 transmits job data of the pull print job JB to the MFP 10a (time T3 of FIG. 12). The pull print job JB includes a command indicating that the job data of the pull print job JB should be stored in the HDD 5b of the MFP 10a.

When the MFP 10a receives the job data via a communication unit 4, the MFP 10a temporarily stores the job data to the memory 5a (time T3 of FIG. 12). However, at this occasion, the MFP 10a is executing the preceding job (print output job) JA for the user UA, and is executing processing using the HDD 5b (including reading processing of the document DY and the rasterization processing (RIP processing)). Therefore, the MFP 10a cannot immediately start data storage processing (accumulation processing) for storing storage data (data including information about the storage target file and the like) based on the job data to the HDD 5b (see FIG. 12). Therefore, the storage data have not yet been stored in the HDD 5b, and the data storage processing based on the job data proceeds to the waiting state.

Then, in such waiting state, as shown in FIG. 15, the user UB moves to the location where the MFP 10b is arranged, and operates the MFP 10b to try to cause the MFP 10b to print and output the pull print job. More specifically, after the user UB logs in to the MFP 10b, the user UB operates a predetermined operation screen to give the MFP 10b a display command for displaying a print candidate file list LF of the pull print job of the user UB. In response to the display command, the MFP 10b transmits a display request of the print candidate file list LF (list display request) to the MFP 10a. It should be noted that the display request of the print candidate file list LF is a request indicating that information for displaying the print candidate file list LF (which may also be referred to as list information LT) to be transmitted, and therefore, the display request of the print candidate file list LF may also be referred to as a transmission request of the list information LT.

If the user UB gives the MFP 10b a display command for displaying the print candidate file list LF of the pull print job JB after the time point when the MFP 10a completes the data storage processing based on the job data (time T9 of FIG. 12), then the print candidate file list LF is normally displayed.

However, in this case, the list display request given by the MFP 10b is received by the MFP 10a at a certain point in time between the time T3 (see FIG. 12) and the time T9. When the list display request is received, the MFP 10a has not yet completed the data storage processing based on the job data, and has not yet obtained the data of the storage target document (DZ) of the pull print job JB. Therefore, the list information LT replied from the MFP 10a to the MFP 10b does not include information about the pull print job JB. Therefore, the user UB cannot find the desired print target file in the print candidate file list LF (pull print job list) displayed by the MFP 10b, and the user UB is confused by being unable to find, in the list, the file of the pull print job JB, which the user UB believes to have transmitted to the computer 50. In particular, in many cases, the user UB cannot find that there is a delay due to a job given by another user (e.g., the user UA), and in many cases, the user UB cannot understand the situation. Then, after about a predetermined period of waiting time passes, the user UB is required to perform operation all over again from the login operation to the MFP 10b, and do display operation again to display the print candidate file list LF of the pull print jobs for the user UB.

As described above, in particular, because of the reason that, e.g., the print output processing for the user UA is being executed, there is a problem in that the user UB has no choice but to wait for a relatively long period of time until the MFP 10b displays the desired file in the print candidate file list LF.

Accordingly, as described below, in the present embodiment, the MFP 10a analyzes the header of the job data of the received job (pull print job JB), and determines whether the job is a pull print job JB (which is also referred to as a box save job or a storage job). Then, when the MFP 10a determines that the received job is the pull print job JB, the MFP 10a first executes the simplified analysis processing of the pull print job JB (more specifically, obtaining processing for obtaining the list display information MD) (see FIG. 11 and the like). Thereafter, when the print output job JA is finished, and the waiting state is cancelled, the MFP 10a starts the data storage processing for storing the storage data of the pull print job JB to the HDD 5b (i.e., accumulating the storage data to the HDD). Thereafter, the data storage processing is finished.

Accordingly, after the simplified analysis processing of the pull print job JB, the MFP 10a has already obtained the list display information MD. For this reason, in response to the list display request given by the MFP 10b, the list display information MD of the pull print job JB can be transmitted from the MFP 10a to the MFP 10b. Therefore, in the print candidate file list LF of the MFP 10b, the desired file (file of the latest pull print job JB) can be displayed relatively in a short time.

4. Operation According to the Present Embodiment

Figure 7:
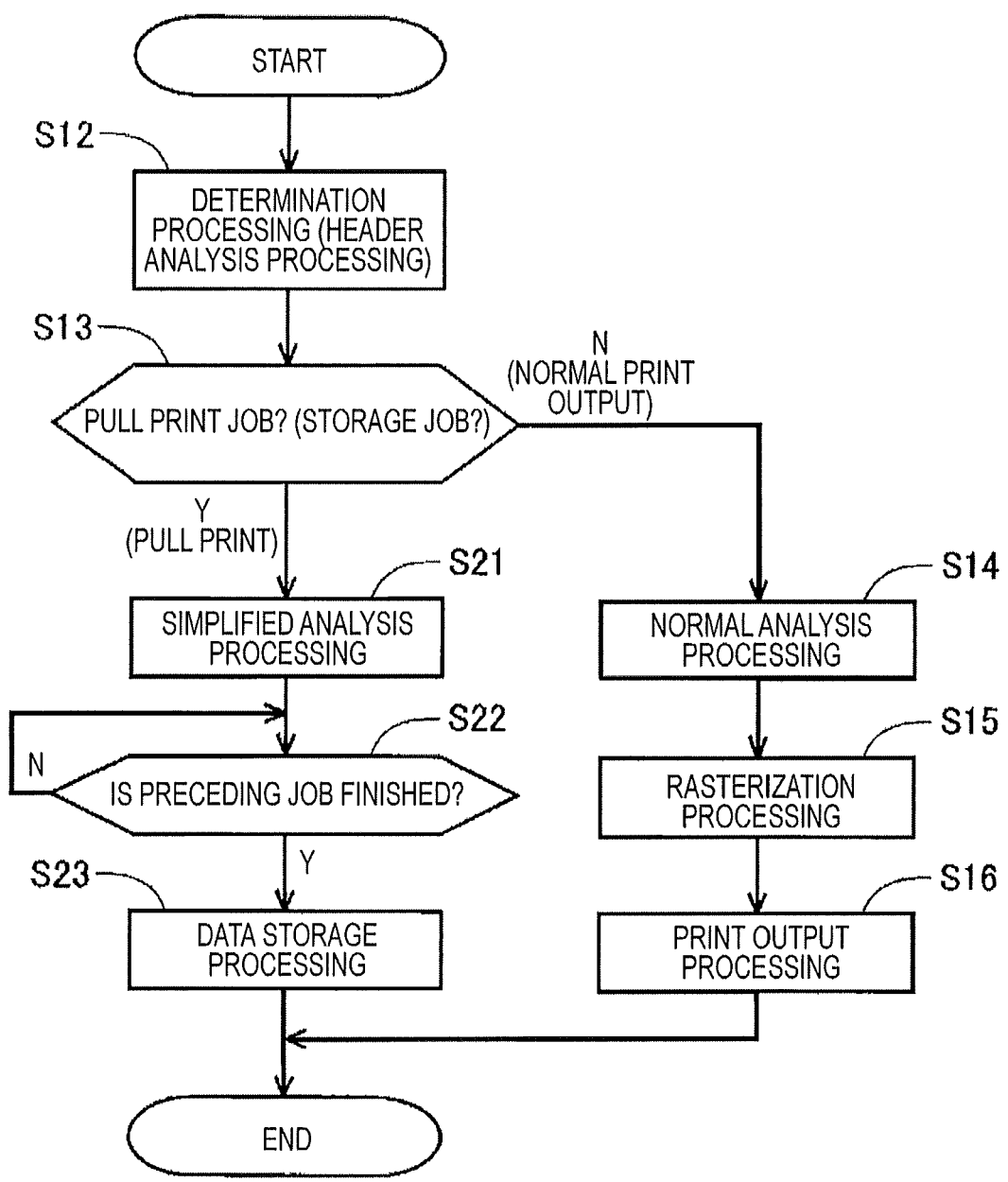
FIG. 7 is a flowchart illustrating a portion of operation of the MFP.
Figure 8:
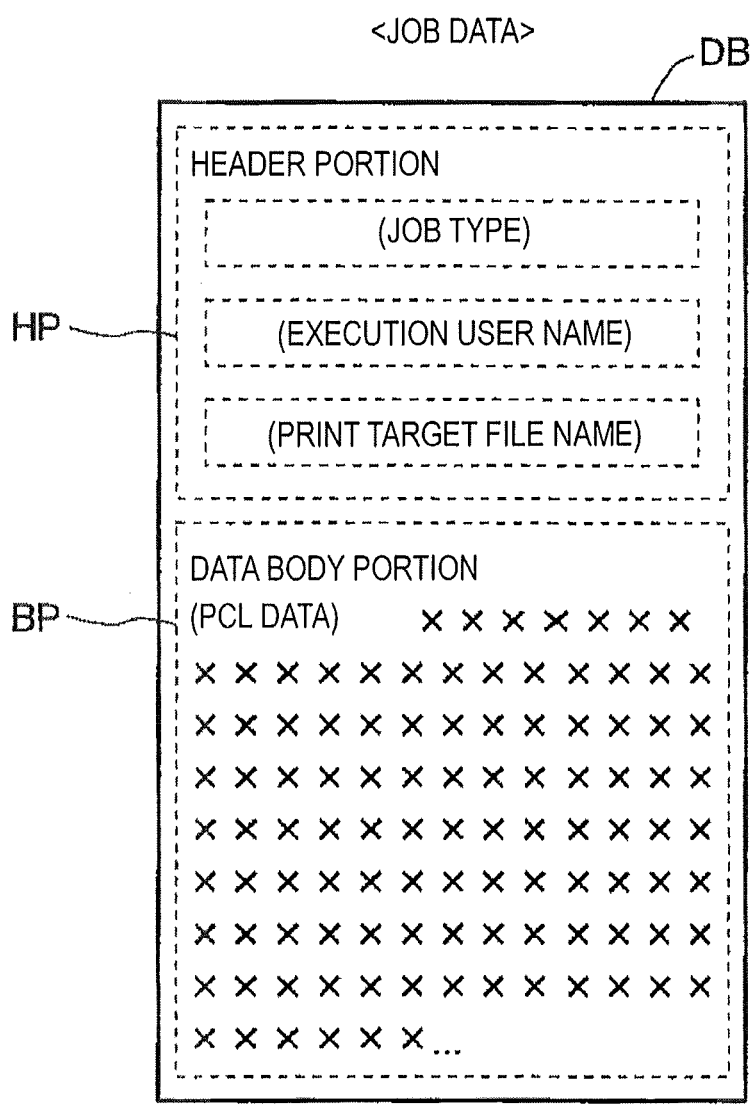
FIG. 8 is a figure illustrating an example of configuration of job data.
Figure 9:
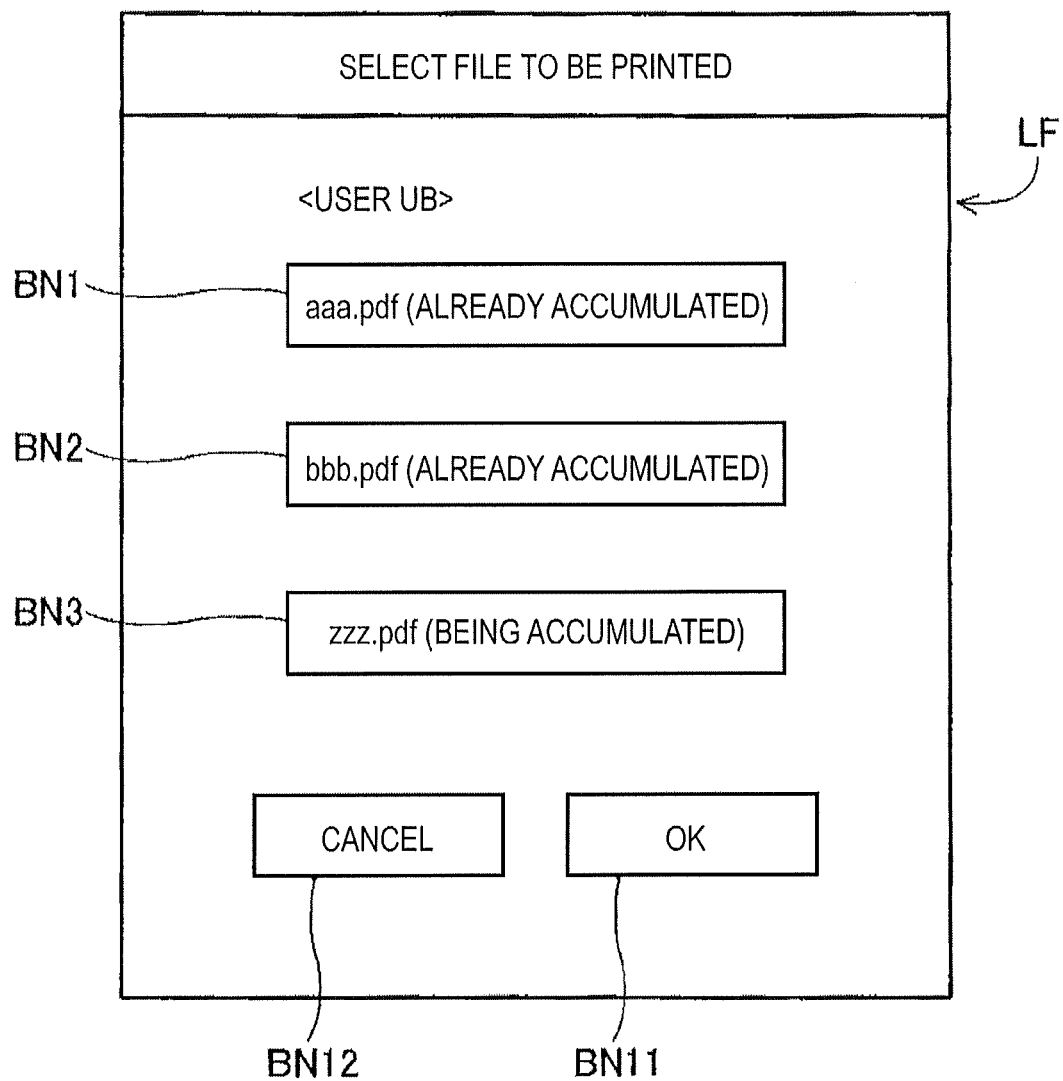
FIG. 9 is a figure illustrating a print candidate file list displayed on an operation unit of the MFP.
Figure 10:
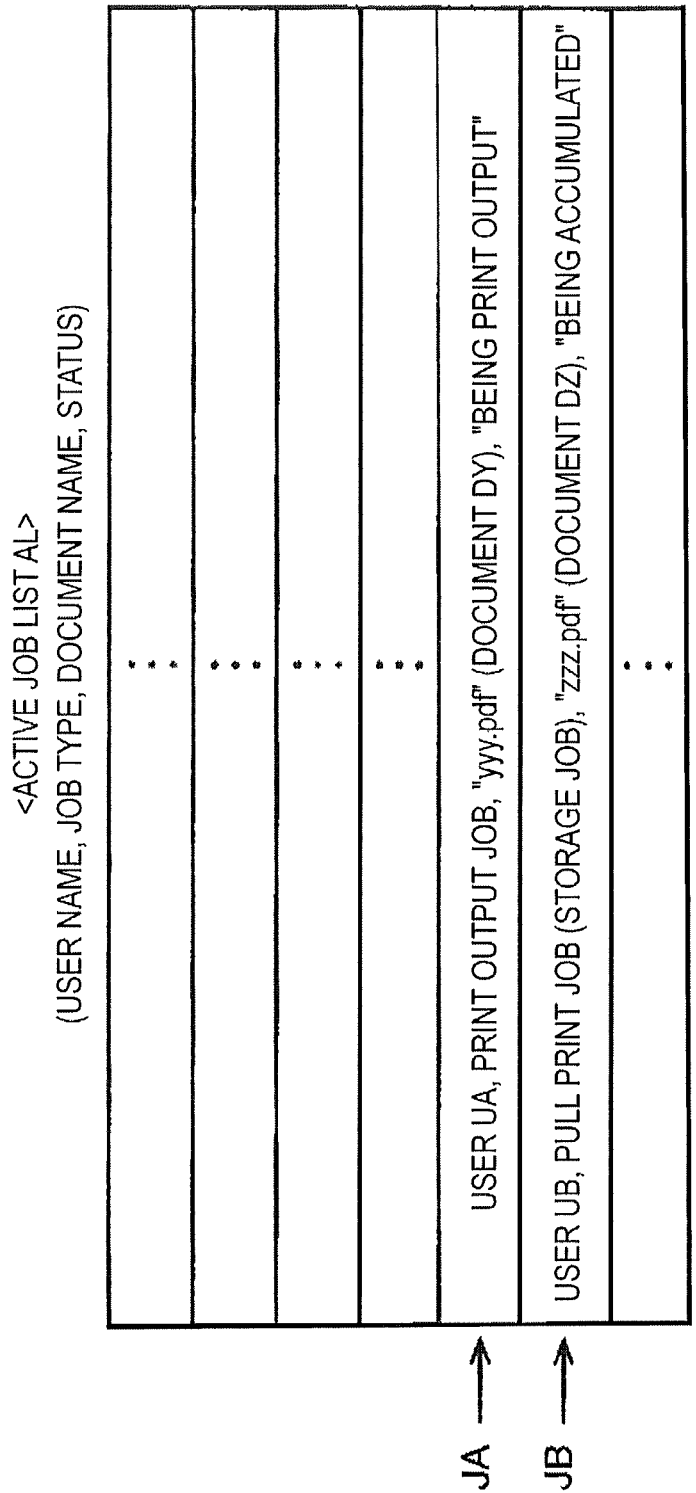
FIG. 10 is a figure illustrating a job list registered to the MFP.
Figure 11:
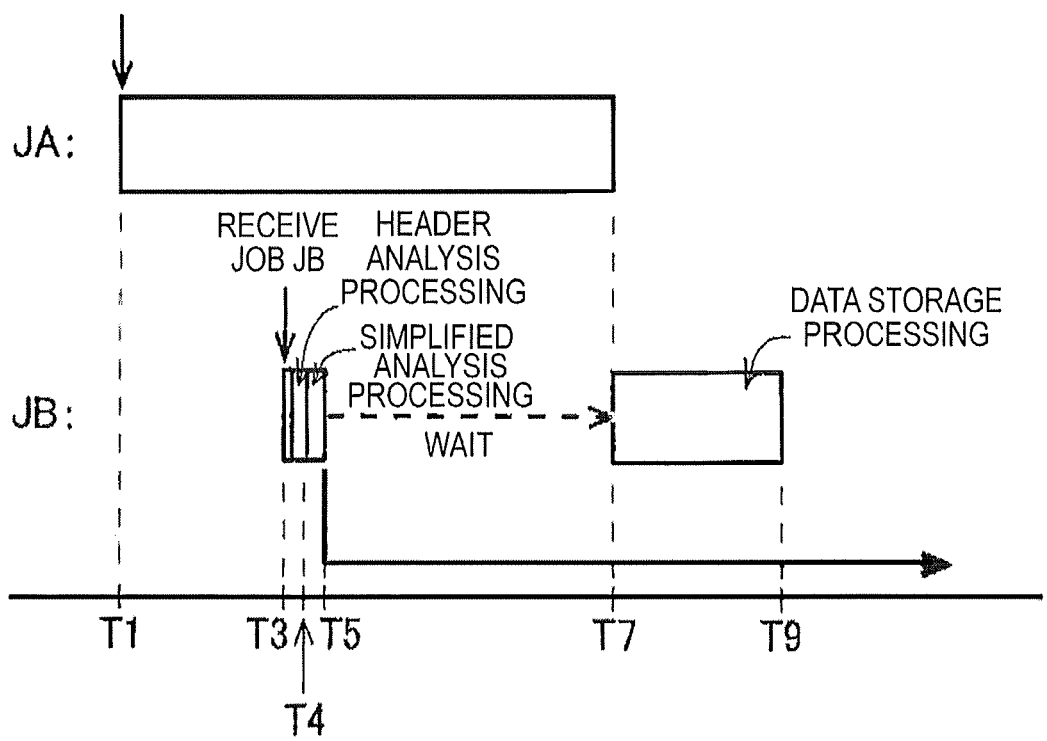
FIG. 11 is a figure illustrating execution timing and the like of each job according to the present embodiment.

Subsequently, operation performed by the system 1 according to the present embodiment will be described further in details with reference to FIGS. 3 to 11. FIGS. 3 to 6 are schematic diagrams illustrating operation of this system 1. FIG. 7 is a flowchart illustrating a portion of operation of the MFP 10a. FIG. 8 is a figure illustrating an example of configuration of job data. FIG. 9 is a figure illustrating a display screen of a print candidate file list LF displayed on an operation unit of the MFP. FIG. 10 is a figure illustrating an active job list AL registered to the MFP. FIG. 11 is a figure illustrating execution timing and the like of each of the jobs JA, JB according to the present embodiment.

In this embodiment, when the job reception unit 11 of the MFP 10a receives a job, the operation according to the flowchart of FIG. 7 is executed. The operation of FIG. 7 is executed for each of the received jobs.

As shown in FIG. 7, first, the MFP 10a (more specifically, the determination unit 12) executes the header analysis processing of the received job (the header analysis processing for analyzing the header portion HP of the job data of the job (see FIG. 8 and the like)), and determines the contents of the job (step S12). Accordingly, a determination is made as to whether the job is a pull print job with data storage processing (storage job) to the HDD 5b of the MFP 10a. More specifically, whether or not the job is a pull print job or an ordinary print output job is determined on the basis of information indicating "job type" in the header portion HP. For example, in a case where the header portion HP of the job data indicates that the job is a "pull print job", the job is determined to be the pull print job. On the other hand, in a case where the header portion HP indicates that the job is an "(ordinary) print output job", the job is determined to be the print output job.

When the job is determined to be the ordinary print output job JA, the print data generation unit 13 of the MFP 10a executes ordinary print job analysis processing (step S14) and rasterization data generation processing (step S15). Then, the print output control unit 19 and the print output unit 3 of the MFP 10a executes print output processing based on the generated rasterization data (step S16). In step S14, the registration operation is performed to register the print output job JA to the active job list AL in the MFP 10a (FIG. 10). FIG. 10 shows how the print output job JA is registered to the active job list AL. More specifically, this indicates that, with regard to the job JA, the execution user is the user UA, the job type is "print output job", the print output target is a document DY "yyy.pdf", and the status is "print output process". Such registration operation is performed by the job registration control unit 18.

On the other hand, when the job is determined to be the pull print job JB, the analysis unit 15 of the MFP 10a executes the simplified analysis processing of the job data of the job (step S21). Thereafter, when the print output job JA is determined to be completed in step S22 (in other words, the waiting state of the data storage processing is determined to have been cancelled), step S23 is subsequently performed. In step S23, the storage control unit 16 of the MFP 10a executes the data storage processing of the storage data on the basis of the job data. It should be noted that, in step S21, the registration operation is also performed to register the pull print job JB into the active job list AL in the MFP 10a (FIG. 10) on the basis of the result of the simplified analysis processing. FIG. 10 shows how the pull print job JB is registered to the active job list AL. More specifically, this indicates that, with regard to the job JB, the execution user is the user UB, the job type is "pull print job (storage job)", the storage target document is the document DZ (file name "zzz.pdf"), and the status is "accumulation process" (not yet stored). Such registration operation is performed by the job registration control unit 18.

Figure 3:
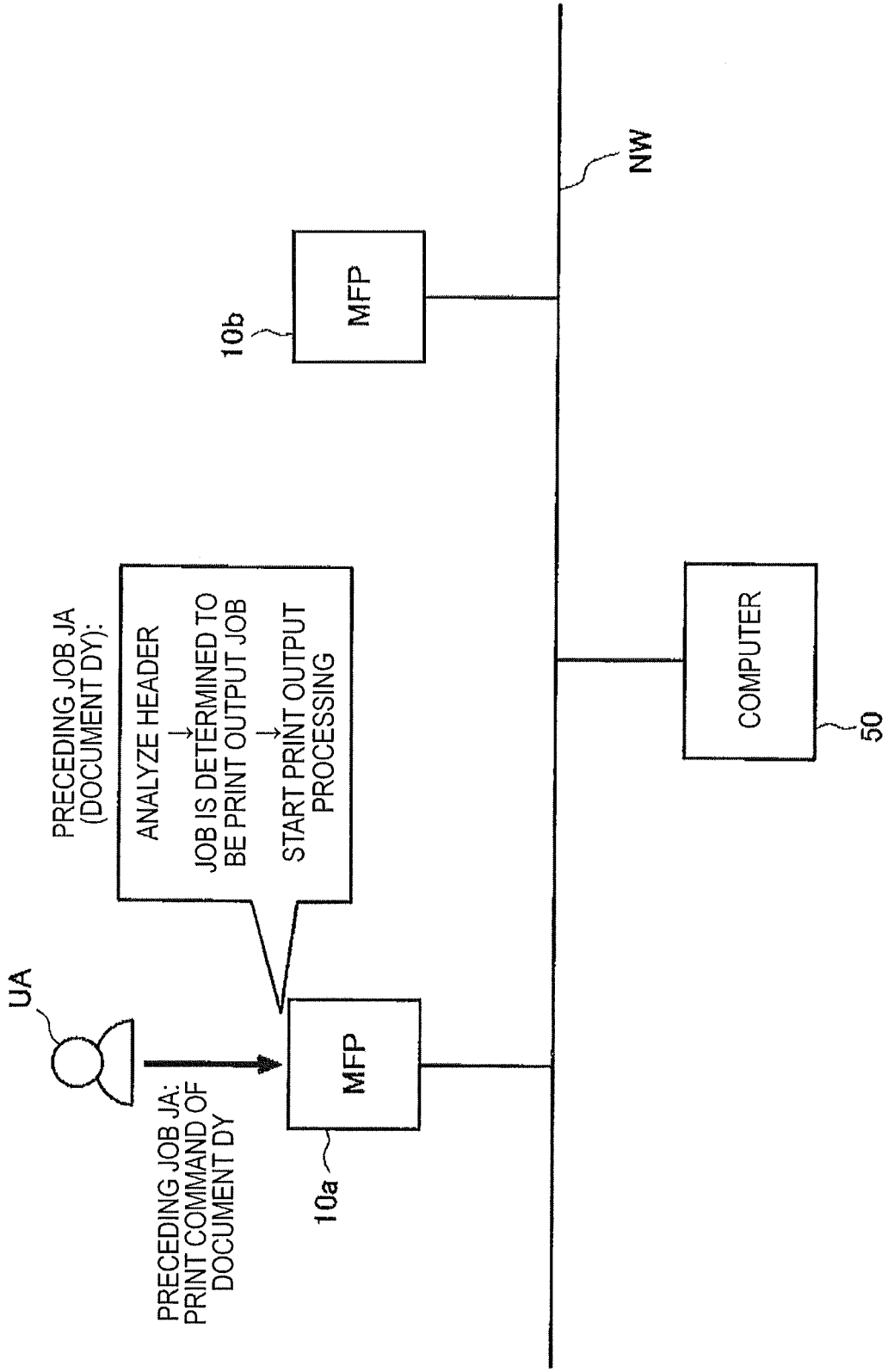
FIG. 3 is a schematic diagram illustrating operation of the print system.

By the way, as shown in FIG. 3, this embodiment is like the above comparative example, and, first, the user UA operates the MFP 10a to give the print output job JA to the MFP 10a. In the explanation below, the difference from the comparative example will be mainly described.

When the MFP 10a receives the job JA at the time T1 of FIG. 11, the MFP 10a executes operation of FIG. 7 described above. More specifically, the MFP 10a performs the header analysis processing of the print output job JA, and confirms that the print output job JA is not box save processing. Then, the execution processing of the print output job JA (more specifically, the print output processing) is started. In this case, it takes a relatively long time to perform the print output processing of the print output job JA.

Figure 4:
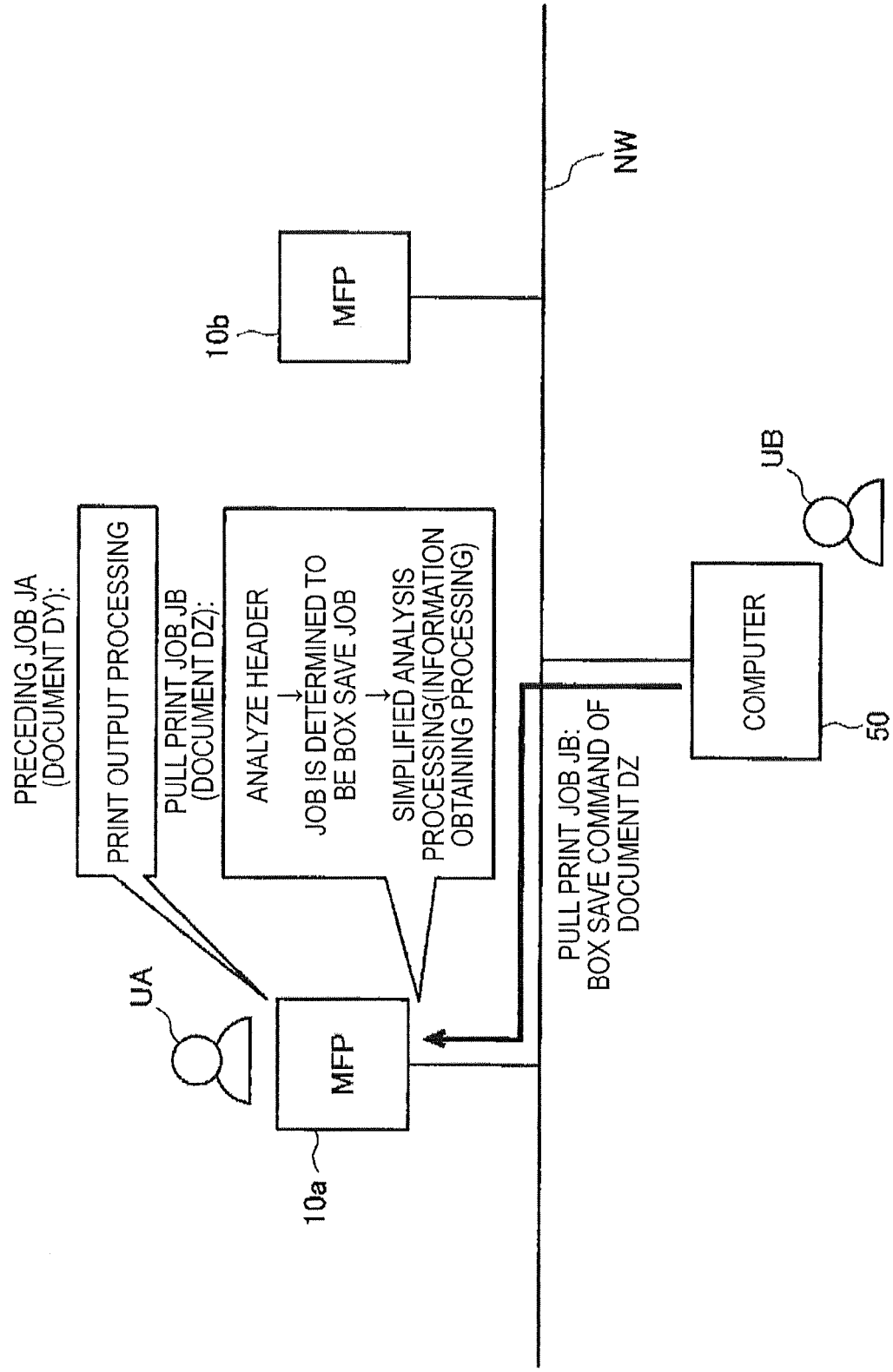
FIG. 4 is a schematic diagram illustrating operation of the print system.

Subsequently, as shown in FIG. 4, an execution command of the pull print job JB (more specifically, the data storage processing) is given by the user UB and the computer 50 (the time T3 of FIG. 11). More specifically, in response to the operation performed by the user UB (who is different from the user UA), the computer 50 receives a request of the pull print job JB (job with the storage job), the computer 50 transmits the job data of the pull print job JB to the MFP 10a.

When the MFP 10a receives the pull print job JB by receiving the job data via the communication unit 4 and the job reception unit 11, the MFP 10a temporarily saves the job data to the memory 5a (the time T3 of FIG. 11). At this occasion, the MFP 10a is executing the preceding job (print output job) JA for the user UA, and is executing the processing using the HDD 5b (the processing of the print output job JA, including the reading processing and the rasterization processing of the document). Therefore, the MFP 10a cannot immediately start the data storage processing for storing the storage data to the HDD 5b on the basis of the job data. However, unlike the above comparative example, the MFP 10a executes the operation described below.

When the MFP 10a receives the job JB at the time T3 of FIG. 11, the MFP 10a executes operation of FIG. 7.

More specifically, first, the MFP 10a (determination unit 12) performs header analysis processing of the received job data (pull print job JB) (step S12 of FIG. 7).

Subsequently, when the header analysis processing is completed (the time T4 of FIG. 11), a determination is made as to whether the received job is processing with data storage processing or not. In this case, suppose that it is confirmed that the job (pull print job JB) is processing with the data storage processing (more specifically, the box save processing for saving data into a box (in the HDD 5b)).

When such contents are confirmed, first, the analysis unit 15 of the MFP 10a executes the simplified analysis processing of the pull print job JB (the obtaining processing for obtaining the list display information MD) (step S21). More specifically, the analysis unit 15 analyzes the header portion HP of the job data temporarily stored in the memory 5a, and obtains the list display information MD. In this case, the simplified analysis processing is also performed by, e.g., analyzing the header portion HP of the job data. However, the embodiment is not limited thereto. The simplified analysis processing may be performed by analyzing a portion of data of the data body portion BP (for example, data described in PCL).

According to such simplified analysis processing, the MFP 10a obtains the list display information MD (more specifically, the user name of the execution user of the pull print job JB, the file name of the storage target data of the pull print job JB (more specifically, the storage target file), the status of the pull print job JR, and the like). Then, the MFP 10a registers the obtained information into the active job list AL in the apparatus (MFP 10a) (FIG. 10).

It should be noted that the simplified analysis processing is finished in an extremely shorter time as compared with the storage processing of the pull print job JB (the storage processing to the HDD 5b) (the time T5 of FIG. 11).

In this case, the processing in steps S12, S13, S21, S22 for the pull print job JB can also be executed in parallel with the rasterization processing (step S15) and the print output processing (step S16) for the print output job JA. At the time point of execution of the processing, the print output processing of the print output job JA has not yet finished, and the rasterization processing or the print output processing for the print output job JA is being executed. More specifically, the processing in steps S12, S21, and the like for the pull print job JB is considered to be executed in parallel with the rasterization processing (step S15) and/or the print output processing (step S16) of the print output job JA.

Figure 5:
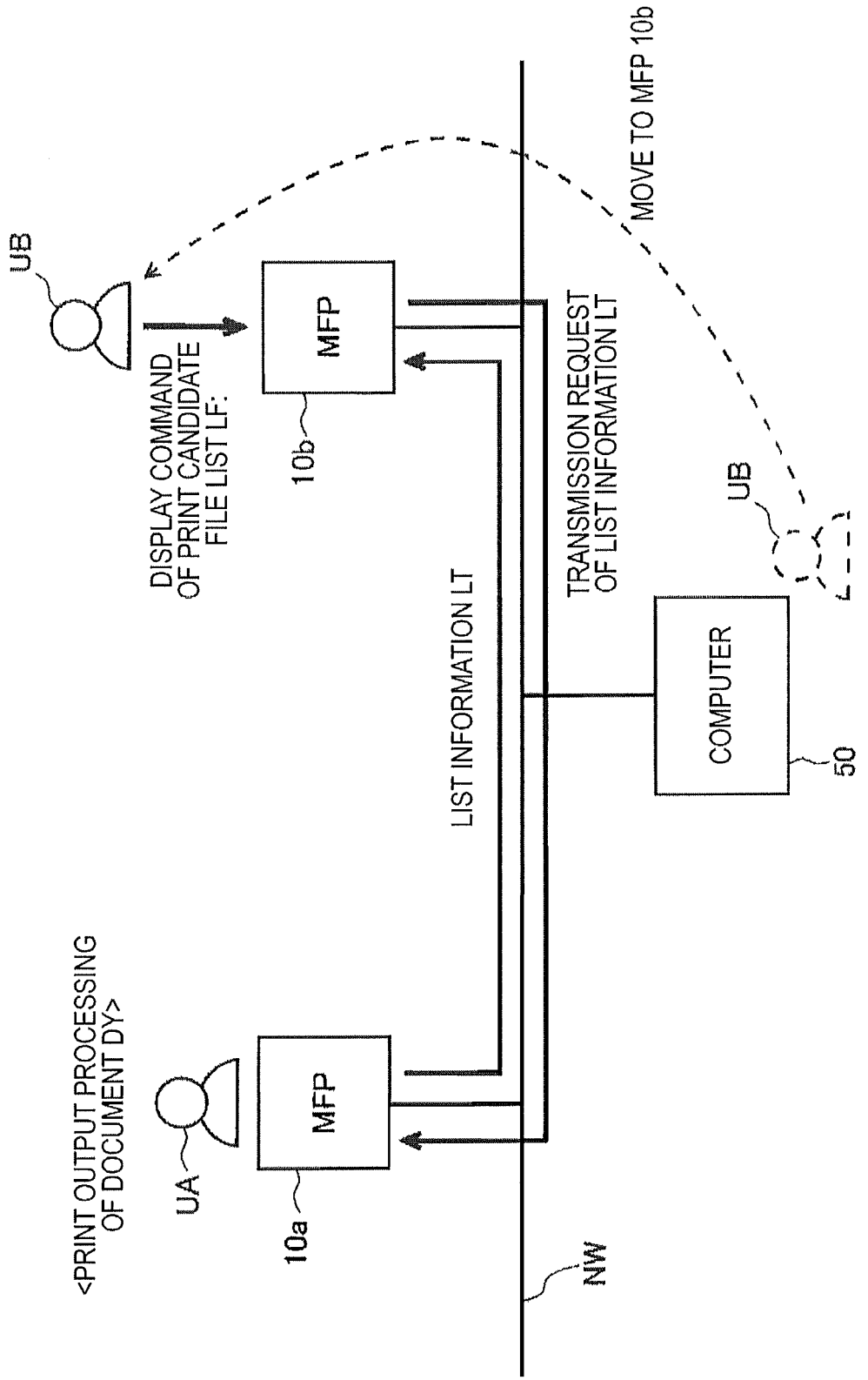
FIG. 5 is a schematic diagram illustrating operation of the print system.
Figure 6:
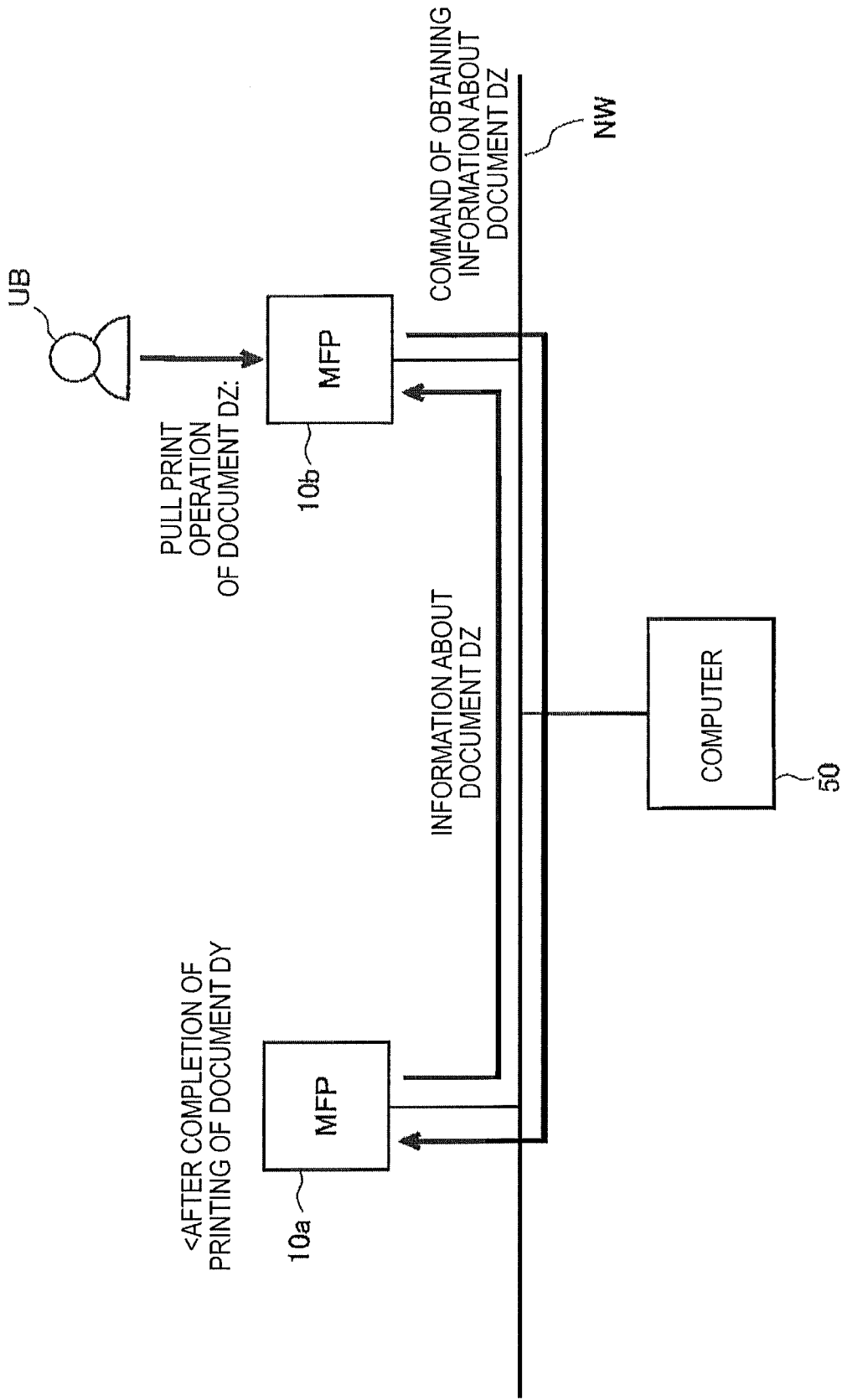
FIG. 6 is a schematic diagram illustrating operation of the print system.

Then, as shown in FIG. 5, the user UB moves to the location where the MFP 10b is arranged, and the user UB operates the MFP 10b to try to cause the MFP 10b to print and output the pull print job. More specifically, the user UB logs in to the MFP 10b by performing the authentication operation (input operation of login ID and password) and the like, and thereafter, the user UB operates a predetermined operation screen to give the MFP 10b the display command for displaying the print candidate file list LF of the pull print job for the user UB (FIG. 9). In response to the display command, the MFP 10b transmits the display request of the print candidate file list LF (in other words, transmission request of the list information LT) to the MFP 10a. It should be noted that the login processing (authentication processing) of the MFP 10b is performed by the authentication processing unit 21 of the MFP 10b (FIG. 2), and the transmission processing of the list display request in the MFP 10b is performed by the communication unit 4, the display request processing unit 23, and the like of the MFP 10b (FIG. 2).

The MFP 10a receives the list display request (the transmission request of the list information LT), and then, in response to the list display request, the MFP 10a transmits the list information LT about the print candidate file list LF (which will be also referred to as the job list data) to the MFP 10b. It should be noted that the reception processing of the list display request in the MFP 10a is performed by the communication unit 4, the display request processing unit 23, and the like of the MFP 10a (FIG. 2).

More specifically, the display request processing unit 23 of the MFP 10a generates the list information LT about the print candidate file list LF on the basis of the information registered in the active job list AL. The job information obtained in the simplified analysis processing (step S21) (including the list display information MD), the job information obtained in the ordinary print job analysis processing (step S14), and the like are reflected and registered in the active job list AL. More specifically, the active job list AL includes information about multiple types of jobs. The active job list AL also includes jobs for multiple users.

The display request processing unit 23 of the MFP 10a extracts only the jobs of a particular type (pull print job) for the particular user UB, who is the source of request of the list display request, from among multiple types of jobs for multiple users included in the active job list AL. Then, the display request processing unit 23 generates, as the list information LT, information about the job extracted (e.g., information about the storage target data of the job). For example, the information about the storage target data of the job JB includes information about the execution user of the job (execution user information), information about the storage target file (storage target file information), and information about the status of the job JB (status information). More specifically, the list information LT includes information indicating that, e.g., the execution user of the job (pull print job) JB is the user UB, that the file name of the storage target file of the job JB (document DZ) is "zzz.pdf", and the status of the job JB is "accumulation process (accumulation processing)".

The MFP 10b displays the print candidate file list LF of the pull print job for the user UB (FIG. 9) on the basis of the received list information LT (job list data). Since the simplified analysis processing of the pull print job JB has already been finished, the information about the pull print job is also displayed in this print candidate file list LF. More specifically, in the print candidate file list LF, not only the storage target files previously stored ("aaa.pdf" and "bbb.pdf") but also the storage target file of the latest pull print job JB "zzz.pdf" are displayed as the print target files. Information indicating that, e.g., the latest document file "zzz.pdf" is in the "accumulation process" (not stored) is displayed on the basis of the status information about the job JB. It should be noted that the display processing of the print candidate file list LF in the MFP 10b is performed by the display control unit 25 of the MFP 10b (FIG. 2) and the like.

The user UB uses the print candidate file list LF to designate the desired print target file as the print target data, and the user UB can print and output the desired print target file, or prepare for printing and outputting of the print target file in advance. More specifically, the user UB presses down a button BN3 corresponding to the desired print target file "zzz.pdf" in the print candidate file list LF, and changes the button BN3 into selected state, and thereafter, the user UB further presses down an OK button BN11. Accordingly, the file "zzz.pdf" is designated as the print target data, and the print output command (print output reservation) for the print target data is given. When the OK button BN11 is pressed down after multiple files are made into selected state, multiple files can be designated as the print target data.

In this case, when the latest file "zzz.pdf" is not yet accumulated (not yet stored), the reservation processing of the print output is considered to be performed. However, the embodiment is not limited thereto. For example, a file not yet accumulated (not yet stored) may be displayed in the print candidate file list LF but not allowed to be selected as a print target file. More specifically, after the MFP 10a finishes the data storage processing of the latest file, the MFP 10a transmits, to the MFP 10b, a completion notification for notifying that the storing has been finished, and the MFP 10b having received the completion notification updates the print candidate file list LF. Then, the MFP 10b changes the status indication of the latest file "zzz.pdf" from the "accumulation process" to the "accumulated" and the like, and the latest file of which storage processing has been finished is configured to be selectable as the print target file.

When the preceding job (print output job) JA is finished (the time T7 of FIG. 11) (in other words, when the waiting state of the data storage processing is cancelled), steps S22 to S23 of FIG. 7 are subsequently performed. In step S23, the MFP 10a (more specifically, the storage control unit 16) starts the data storage processing for storing the storage data based on the job data of the pull print job JB (including the storage target data) to the HDD 5b (i.e., the accumulation processing for accumulating the data to the HDD 5b). Then, the data storage processing (the data storage processing of the pull print job JB) is finished (the time T9 of FIG. 11). As described above, after the execution of the simplified analysis processing of the pull print job JB and after the execution of the preceding job JA, the storage target data of the pull print job JB (the document data of the storage target and the like) are stored in the HDD 5b.

In a case where the data storage processing of the pull print job JB has already been finished at point in time when the above print output command is given (more specifically, at the point in time when the OK button BN11 is pressed down), the MFP 10b executes the print output operation and the like.

More specifically, in response to the print output command, the MFP 10b transmits a transmission request of the print data of the print target file "zzz.pdf" to the MFP 10a, and in reply to the transmission request, the MFP 10a transmits the print data to the MFP 10b. It should be noted that the print data may be, for example, the document data of the print target itself, or the rasterization data of the document data. Then, the MFP 10b prints and outputs the storage target data of the pull print job JB (document DZ: print target file "zzz.pdf") on the basis of the received print data.

On the other hand, in a case where the data storage processing of the pull print job JB has not yet been finished at the point in time when the above print output command was given, a warning indicating that the data storage processing has not yet been finished is displayed on the display unit 6b of the MFP 10b. The user UB sees the warning, and the user UB can make a selection as to whether to cancel the printing, or wait for the completion of the data storage processing of the pull print job JB.

According to the operation described above, after the simplified analysis processing (step S21) has been finished (after the time T5 of FIG. 11), the MFP 10a has already obtained the list display information MD. Therefore, in response to the display request of the print candidate file list LF from the MFP 10b, the MFP 10a can respond using the list information reflecting the latest information (list display information MD and the like) (more specifically, the list information including information about the storage target data "document DZ") LT. Then, because the list information LT is transmitted from the MFP 10a to the MFP 10b, the MFP 10b can display the "information about the storage target data" of the pull print job JB (more specifically, the file name of the storage target file (print target file) and the like) in the print candidate file list LF in a relatively short time.

As described above, when the pull print job JB is executed, the storage target data of the pull print job JB (more specifically, the information about the storage target data) can be displayed in the print candidate file list LF relatively in a short time (normal display). More specifically, in the comparative example, the normal display can be shown only after the time T9 (see FIG. 12), but in this embodiment, the normal display can be shown at any given point in time after the time T5 (see FIG. 11).

More specifically, before the MFP 10a performs the data storage processing of the pull print job JB (storage job), the MFP 10a performs the simplified analysis processing for obtaining the list display information MD for displaying the storage target data ("document DZ") as a list.

Therefore, after the simplified analysis processing, the MFP 10b can display the print candidate file list LF including the information about the storage target data on the basis of the list information LT reflecting the list display information MD. More specifically, the "information about the storage target data" included in the list display information MD can also be included in the list information LT, and the MFP 10b can display the print candidate file list LF including the information about the storage target data on the basis of the list information LT. More specifically, when the MFP 10b displays the print candidate file list LF including the information about the storage target data, it is not necessary to wait for completion of the data storage processing of the storage job. In other words, even before the MFP 10a finishes the data storage processing of the storage job, the MFP 10b can display, as a list, the information about the storage target data of the storage job (more specifically, the file name of the storage target data "document DZ" and the like).

In particular, while executing the print output job which is received before the pull print job (storage job) JB and which uses the HDD 5b (which may be also referred to as a preceding job) JA, the simplified analysis processing is executed in parallel with the preceding job JA. Therefore, even when there is the preceding job JA which is being processed (processing not completed), the MFP 10b can display the print candidate file list LF including the "information about the storage target data" of the pull print job JB (the list information LT) relatively in a short time, without waiting for the completion of the preceding job JA.

In the embodiment described above, in the normal print job analysis processing, e.g., the simplified analysis processing, which is separate therefrom, is executed, so that the list display information MD for displaying the storage target data as a list is obtained. More specifically, the header analysis processing and the simplified analysis processing are additionally executed, whereby the list display information MD is obtained. Therefore, it is not necessary to change the normal print job analysis processing itself (it is not necessary to greatly change the design of the program), and therefore, as compared with a case where parallel processing is performed by decomposing the normal print job analysis processing itself, the above operation can be executed relatively easily.

In the above embodiment, when an error occurs in the MFP 10a while the print output job (preceding job) JA is executed, the MFP 10a (notification processing unit 17) preferably notifies (transmits), to the MFP 10b, error information indicating that the error occurs in the MFP 10a and the contents of the error. When the MFP 10b (notification processing unit 17) receives the error information, the MFP 10a may display the information about the error (the information indicating, e.g., that the error occurs during the execution of the preceding job and the contents of the error) on the display unit 6b of the MFP 10a. Accordingly, the user UB who logs in to the MFP 10b can notice, in a short time, that the storage processing of the print target file "zzz.pdf" (document DZ) of the subsequent pull print job JB may also be delayed with a high degree of possibility because the error occurs in relation to the preceding job JA in the MFP 10a.

5. Modifications and the Like

The embodiment of this invention has been hereinabove described, but this invention is not limited to the contents described above.

For example, in the above embodiment, the list information LT is generated as including the information about the execution user of the job, the information about the storage target file, and the information about the status of the job JB, which serve as the information about the storage target data of the job JB. However, the embodiment is not limited thereto. The list information LT may also be generated as including only some of the above, e.g., only the information about the storage target file (the file name of the storage target file and the like). In other words, the list information LT may be all or a part of the list display information MD.

The above embodiment shows the case where, for example, the user UA gives the execution command of the print output job JA to the MFP 10a prior to the pull print job JB, but the embodiment is not limited thereto. The concept described above may also be applied to a case where the user UA gives an execution command of a job of another type (for example, a pull print job JC) to the MFP 10a prior to the pull print job JB. More specifically, the MFP 10a may apply the simplified analysis processing and the like of the pull print job JB in parallel with the pull print job JC and obtain the list display information MD. According to this configuration, without waiting for the completion of the pull print job JC (storage job) which is the preceding job, the document file of the pull print job JB which is the subsequent job can be displayed in the print candidate file list LF.

The above embodiment shows the case where, for example, the document file included in the job data of the pull print job JB (the storage target file) is stored in the HDD 5b of the MFP 10a as the storage data. However, the embodiment is not limited thereto. For example, rasterization data of the pull print job JB for print/output (RIP data) may be stored in the HDD 5b of the MFP 10a as the storage data of the job data.

6. Summary of Embodiment

According to the embodiment described above, prior to data storage processing, simplified analysis processing is performed to obtain list display information for displaying storage target data as a list. Then, after the simplified analysis processing, a second image forming apparatus can be caused to display information about the storage target data on the basis of the list display information. Therefore, the second image forming apparatus is not required to wait for completion of the data storage processing of the storage job, and the second image forming apparatus can display, in a list, the storage target data of the storage job relatively in a short time.

In particular, the simplified analysis processing is executed in parallel with a preceding job, and therefore, when the second image forming apparatus displays list information, it is not necessary to wait for completion of the preceding job. Therefore, even when there exists a preceding job which is being processed, the second image forming apparatus can display, in a list, the storage target data of the storage job relatively in a short time.

Although the present invention has been described and illustrated in detail, it is clearly understood that the same is by way of illustration and example only and is not to be taken by way of limitation, the scope of the present invention being interpreted by terms of the appended claims.

What is claimed is:

1. An image forming apparatus constituting a print system, the image forming apparatus comprising:
   a reception unit configured to receive a job;
   a determination unit configured to analyze job data of the job, and determine whether or not the job involves a storage job for performing data storage processing to a non-volatile storage unit of the image forming apparatus;
   an analysis unit configured to, in a case where the job is determined to involve the storage job, perform simplified analysis processing for obtaining, on the basis of the job data, list display information for displaying, as a list, storage target data stored by the storage job, prior to the data storage processing; and
   a communication unit configured to transmit, to a second image forming apparatus, list information including information about the storage target data which is list information based on the list display information, when the communication unit receives a display request for displaying a list of a job or two or more jobs including the storage job from the second image forming apparatus which is an image forming apparatus different from a first image forming apparatus which is the image forming apparatus.

2. The image forming apparatus according to claim 1, wherein while a preceding job which is received before the storage job and which uses the storage unit is being executed, the analysis unit executes the simplified analysis processing in parallel with the preceding job.

3. The image forming apparatus according to claim 2, wherein the preceding job is executed by a first user, and
   the storage job is executed by a second user who is different from the first user.

4. The image forming apparatus according to claim 2 further comprising a storage control unit configured to, in a case where the job is the storage job, store storage data of the storage job to the storage unit after execution of the simplified analysis processing and after execution of the preceding job.

5. The image forming apparatus according to claim 2 further comprising a notification unit configured to notify the second image forming apparatus that an error occurs in the first image forming apparatus during execution of the preceding job.

6. The image forming apparatus according to claim 1, wherein the list display information includes information indicating an execution user of the storage job and information indicating a storage target file of the storage job.

7. The image forming apparatus according to claim 6, wherein the list display information further includes information indicating a status of the storage job.

8. The image forming apparatus according to claim 1 further comprising:
   a volatile memory configured to temporarily store the job data of the storage job which is requested using a storage job request source apparatus; and
   a storage control unit configured to store storage data of the storage job to the storage unit on the basis of the job data temporarily stored in the memory after execution of the simplified analysis processing.

9. The image forming apparatus according to claim 1, wherein the analysis unit analyzes a header portion of the job data, and obtains the list display information.

10. The image forming apparatus according to claim 1, wherein the storage job is a job included as a portion of a pull print job.

11. The image forming apparatus according to claim 1 further comprising a job registration control unit configured to reflect the list display information and register the job in a job list of an execution job in the image forming apparatus.

12. A print system comprising a plurality of image forming apparatuses, the print system including:

a first image forming apparatus configured to receive various kinds of job;

a storage job request apparatus configured to receive a request of a storage job in accordance with operation of an operator, and transmit data of the storage job to the first image forming apparatus; and a second image forming apparatus configured to display a list of a job or two or more jobs including the storage job, and designate print target data on the basis of the list, wherein the first image forming apparatus includes:

a reception unit configured to receive a job;

a determination unit configured to analyze job data of the job, and determine whether or not the job involves a storage job for performing data storage processing to a non-volatile storage unit of the first image forming apparatus;

an analysis unit configured to, in a case where the job is determined to involve the storage job, perform simplified analysis processing for obtaining, on the basis of the job data, list display information for displaying, as a list, storage target data stored by the storage job, prior to the data storage processing; and a communication unit configured to transmit, to the second image forming apparatus, list information including information about the storage target data which is list information based on the list display information, when the communication unit receives a display request for displaying a list of a job or two or more jobs including the storage job from the second image forming apparatus.

13. The print system according to claim 12, wherein while a preceding job which is received before the storage job and which uses the storage unit is being executed, the analysis unit executes the simplified analysis processing in parallel with the preceding job.

14. A non-transitory recording medium storing a computer readable program, the program causing a computer served as an image forming apparatus to execute the processing comprising the steps of:

a) receiving a job;

b) analyzing job data of the job, and determining whether or not the job involves a storage job for performing data storage processing to a non-volatile storage unit of the image forming apparatus;

c) in a case where the job is determined to involve the storage job, performing simplified analysis processing for obtaining, on the basis of the job data, list display information for displaying, as a list, storage target data stored by the storage job, prior to the data storage processing;

d) when receiving a display request for displaying a list of a job or two or more jobs including the storage job from a second image forming apparatus which is an image forming apparatus different from a first image forming apparatus which is the image forming apparatus, transmitting list information, which indicates information about the storage target data which is list information based on the list display information, to the second image forming apparatus.

15. The non-transitory recording medium according to claim 14, wherein the step c) includes a step of c-1) executing the simplified analysis processing in parallel with the preceding job while a preceding job which is received before the storage job and which uses the storage unit is being executed.

* * * * *